(12) United States Patent
Spring et al.

(10) Patent No.: US 11,873,096 B1
(45) Date of Patent: Jan. 16, 2024

(54) AIRCRAFT WING AND PROPULSION SYSTEM

(71) Applicant: Cornerstone Research Group, Inc., Miamisburg, OH (US)

(72) Inventors: S. Alan Spring, Dayton, OH (US); Cory Kays, Beavercreek, OH (US); Joshua Nieman, Centerville, OH (US); Bryan Pelley, Sugarcreek Township, OH (US)

(73) Assignee: Cornerstone Research Group, Inc., Miamisburg, OH (US)

(*) Notice: Subject to any disclaimer, the term of this patent is extended or adjusted under 35 U.S.C. 154(b) by 78 days.

(21) Appl. No.: 17/667,648

(22) Filed: Feb. 9, 2022

Related U.S. Application Data (60) Provisional application No. 63/148,373, filed on Feb. 11, 2021.

(51) Int. Cl.
  *B64C 9/24* (2006.01)
  *B64C 11/02* (2006.01)
  *B64C 11/20* (2006.01)

(52) U.S. Cl.
  CPC ............... *B64C 9/24* (2013.01); *B64C 11/02* (2013.01); *B64C 11/20* (2013.01)

(58) Field of Classification Search
  CPC ............. B64C 9/24; B64C 9/28; B64C 27/16
  See application file for complete search history.

(56) References Cited

U.S. PATENT DOCUMENTS

| | | | |
|---|---|---|---|
| 3,515,500 A | 6/1970 | Nachod | |
| 3,612,444 A | 10/1971 | Girard | |
| 6,098,927 A | 8/2000 | Gevers | |
| 6,308,632 B1 | 10/2001 | Shaffer | |
| 6,561,455 B2 | 5/2003 | Capanna | |
| 6,622,962 B1 | 9/2003 | White | |
| 10,926,868 B1 * | 2/2021 | Ullman | B64C 9/24 |
| 11,305,869 B1 * | 4/2022 | Ward | B64C 9/24 |
| 2016/0031556 A1 | 2/2016 | Bevirt et al. | |
| 2016/0304194 A1 | 10/2016 | Bevirt et al. | |

\* cited by examiner

*Primary Examiner* — Philip J Bonzell
*Assistant Examiner* — Eric Acosta
(74) *Attorney, Agent, or Firm* — Dinsmore & Shohl LLP (57) ABSTRACT

An aircraft wing and propulsion system includes a leading-edge device positioned at the leading edge of an aircraft wing and one or more propulsors affixed to the main body of the aircraft wing. The leading-edge device includes a moveable slat affixed to the aircraft wing with an extension mechanism such that the moveable slat is translatable between a closed position abutting a main body of the aircraft wing and an open position extended from the main body of the aircraft wing to form a gap. An associated method of operating the same during takeoff and landing includes extending the moveable slat to expose the propulsors on the aircraft wing and operating the propulsors during take-off or landing of the aircraft to provide increased power and lift for the aircraft.

19 Claims, 7 Drawing Sheets

AIRCRAFT WING AND PROPULSION SYSTEM

CROSS-REFERENCE TO RELATED APPLICATIONS

This application claims priority to U.S. Provisional Application 63/148,373, filed Feb. 11, 2021, which is incorporated by reference herein in its entirety.

STATEMENT REGARDING FEDERALLY SPONSORED RESEARCH OR DEVELOPMENT

This invention was made with U.S. Government support under Contract No. FA8650-19-D-2904 awarded by the U.S. Air Force Research Laboratory through a subcontract to Cornerstone Research Group Inc. The U.S. Government has certain rights in the invention.

TECHNICAL FIELD

Embodiments of the present disclosure generally relate to an aircraft wing and propulsion system and methods of operating an aircraft including the same.

BACKGROUND

With advancement of electric motor and battery technology over the past decade, numerous aircraft are under development using propulsors distributed along the leading edge of the aircraft's wing. Such a configuration increases the speed of the air across the wing, thus significantly increasing lift, especially during take-off and landing. However, current state-of-the-art designs for distributed propulsors typically utilize fixed pitch propellers thereby limiting the cruise speed of the aircraft to low subsonic values. Other designs have sought to stop the majority of the propulsors during cruise and allow the propellers to fold back along the motor cowling, thereby reducing drag to the extent possible; however, such designs are mechanically more complicated to operate and the resulting folded propeller still has some parasitic drag since it is not covered.

SUMMARY

As such, there is an ongoing need for an alternative distributed propulsor system to those presently known in the art. The present disclosure provides an aircraft wing and propulsion system comprising one or more propulsors that can be stowed within a compartment created by a cap-shaped moveable slat at the leading-edge of the aircraft wing. Such system reduces or eliminates parasitic drag, provides mechanically simpler operation, and results in an aircraft with an unmodified profile during cruising and high speed operations.

Embodiments of the present disclosure relate to an aircraft wing and propulsion system. The system includes a leading-edge device positioned at the leading edge of an aircraft wing and one or more propulsors affixed to the main body of the aircraft wing. The leading-edge device includes a moveable slat affixed to a main body of the aircraft wing with an extension mechanism such that the moveable slat is translatable between a closed position abutting a main body of the aircraft wing and an open position extended from the main body of the aircraft wing to form a gap between the moveable slat and the main body of the aircraft wing, where the movable slat includes an aerodynamically profiled leading face and at least a partially open interior forming a propulsor enclosure. Further, at least a portion of each propulsor extends beyond the main body of the aircraft wing such that the portion of the propulsor is stowed within the propulsor enclosure of the moveable slat of the leading-edge device when the movable slat is in the closed position.

Embodiments of the present disclosure also relate to a method of operating a wing and propulsion system of an aircraft. The wing and propulsion system includes a leading-edge device positioned at the leading edge of an aircraft wing and one or more propulsors affixed to the main body of the aircraft wing. The leading-edge device includes a moveable slat affixed to a main body of the aircraft wing with an extension mechanism such that the moveable slat is translatable between a closed position abutting a main body of the aircraft wing and an open position extended from the main body of the aircraft wing to form a gap between the moveable slat and the main body of the aircraft wing, where the movable slat includes an aerodynamically profiled leading face and at least a partially open interior forming a propulsor enclosure. Further, at least a portion of each propulsor extends beyond the main body of the aircraft wing such that the portion of the propulsor is stowed within the propulsor enclosure of the moveable slat of the leading-edge device when the movable slat is in the closed position. The method includes extending the moveable slat to expose the propulsors on the aircraft wing such that the propeller is positioned within the gap between the moveable slat and the main body of the aircraft wing and operating the propulsors during take-off of the aircraft to provide increased power and lift for the aircraft.

Embodiments of the present disclosure also relate to a method of operating a wing and propulsion system of an aircraft during landing. The wing and propulsion system includes a leading-edge device positioned at the leading edge of an aircraft wing and one or more propulsors affixed to the main body of the aircraft wing. The leading-edge device includes a moveable slat affixed to a main body of the aircraft wing with an extension mechanism such that the moveable slat is translatable between a closed position abutting a main body of the aircraft wing and an open position extended from the main body of the aircraft wing to form a gap between the moveable slat and the main body of the aircraft wing, where the movable slat includes an aerodynamically profiled leading face and at least a partially open interior forming a propulsor enclosure. Further, at least a portion of each propulsor extends beyond the main body of the aircraft wing such that the portion of the propulsor is stowed within the propulsor enclosure of the moveable slat of the leading-edge device when the movable slat is in the closed position. The method includes extending the moveable slat to expose the propulsors on the aircraft wing such that the propeller is positioned within the gap between the moveable slat and the main body of the aircraft wing and operating the propulsors during landing of the aircraft to provide increased power and lift for the aircraft.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure generally relate to an aircraft wing and propulsion system. The aircraft wing and propulsion systems in accordance with the present disclosure seek to utilize a distributed propulsion system and eliminate the in-flight drag of the system by stowing the propulsors inside the leading edge of the wings when they are not needed for take-off or landing. The primary propulsion system of the aircraft, such as one or more propellers or turbine engine, continues to operate for cruise. The aircraft wing and propulsion system may be utilized to support short field take-offs and landings while allowing the aircraft to be configured for high speed flight, including near supersonic speeds, through reduced drag at cruising.

In accordance with embodiments of an aircraft wing and propulsion system 10 and with reference to FIGS. 1A, 1B, 1C, 2, 3, 4, 5, and 6, the system 10 comprises a leading-edge device 20 positioned at the leading edge of an aircraft wing 2 and one or more propulsors 30 affixed to a main body 3 of the aircraft wing 2. The leading-edge device 20 comprises a moveable slat 22 affixed to the main body 3 of the aircraft wing 2 with an extension mechanism 40 such that the moveable slat 20 is translatable between a closed position abutting the main body 3 of the aircraft wing 2 and an open position extended from the main body 3 of the aircraft wing 2 to form a gap 50 between the moveable slat 20 and the main body 3 of the aircraft wing 2. The movable slat 22 comprises an aerodynamically profiled leading face 24 and at least a partially open interior forming a propulsor enclosure 26. Further, at least a portion 32 of each propulsor 30 extends beyond the main body 3 of the aircraft wing 2 such that the portion 32 of each propulsor 30 is stowed within the propulsor enclosure 26 of the moveable slat 22 of the leading-edge device 20 when the movable slat 22 is in the closed position.

In accordance with embodiments of the present disclosure, the leading edge of a conventional aircraft wing may be modified to incorporate the aircraft wing and propulsion system 10 of the present disclosure. Having generally described the various components of the aircraft wing and propulsion system 10, each component and sub-system will be described in further detail. In one or more embodiments, the aircraft 1 comprising the aircraft wing and propulsion system 10 is a fixed wing aircraft.

With reference to FIGS. 1A, 1B, 1C, 2, 3, 4, 5, and 6 the aircraft wing and propulsion system 10 includes the leading-edge device 20 positioned at the leading edge of an aircraft wing 2. The leading-edge device 20 provides an aerodynamic housing for the one or more propulsors 30 of the aircraft wing and propulsion system 10 during cruising operations of the aircraft 1 while allowing utilization of the one or more propulsors 30 during takeoff and landing operations. The leading-edge device 20 includes the moveable slat 22 affixed to the main body 3 of the aircraft wing 2 with the extension mechanism 40 such that the moveable slat 22 is translatable between a closed position abutting the main body 3 of the aircraft wing 2 and an open position extended from the main body 3 of the aircraft wing 2. When in the extended position, a gap 50 is formed between the moveable slat 22 and the main body 3 of the aircraft wing 2 to allow unimpeded operation of the one or more propulsors 30.

Figure 1A:
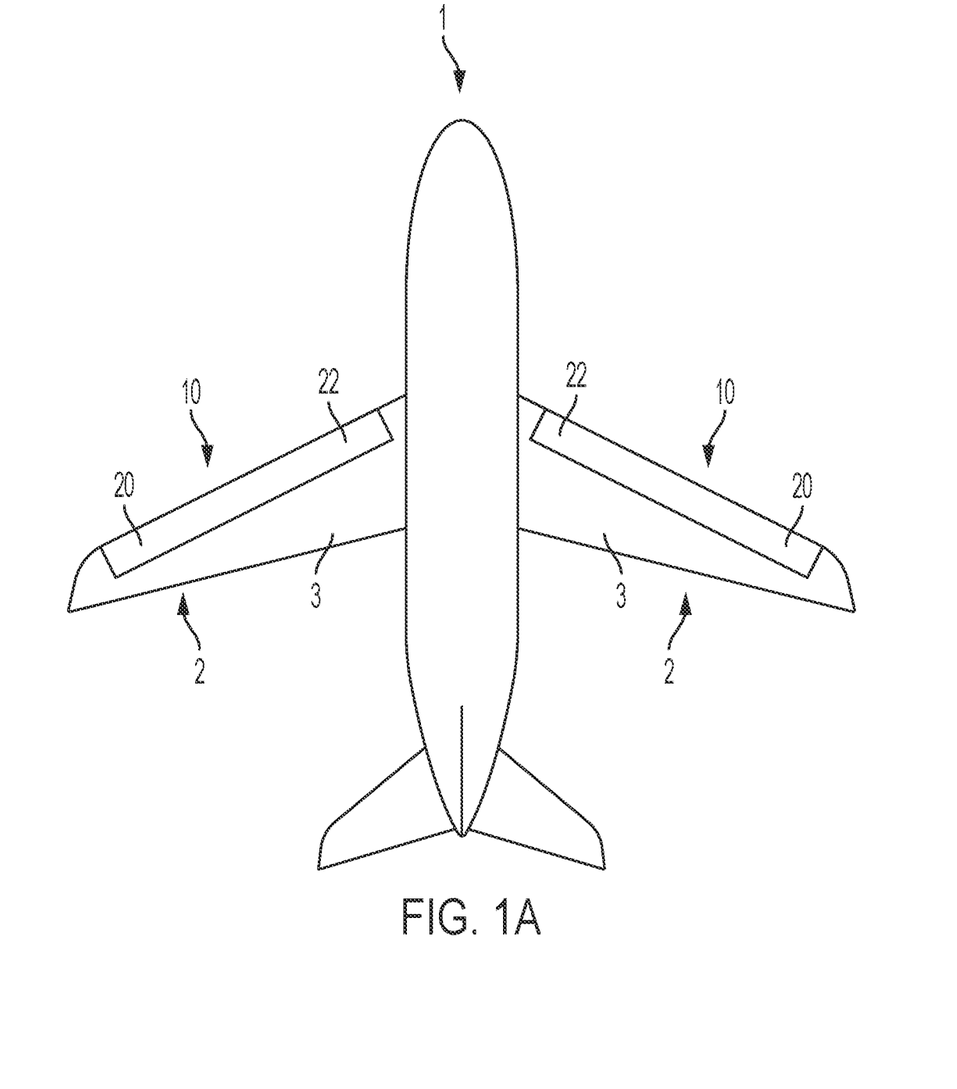
FIG. 1A is an aircraft with an aircraft wing and propulsion system in a closed configuration in accordance with one or more embodiments of the present disclosure.
Figure 1B:
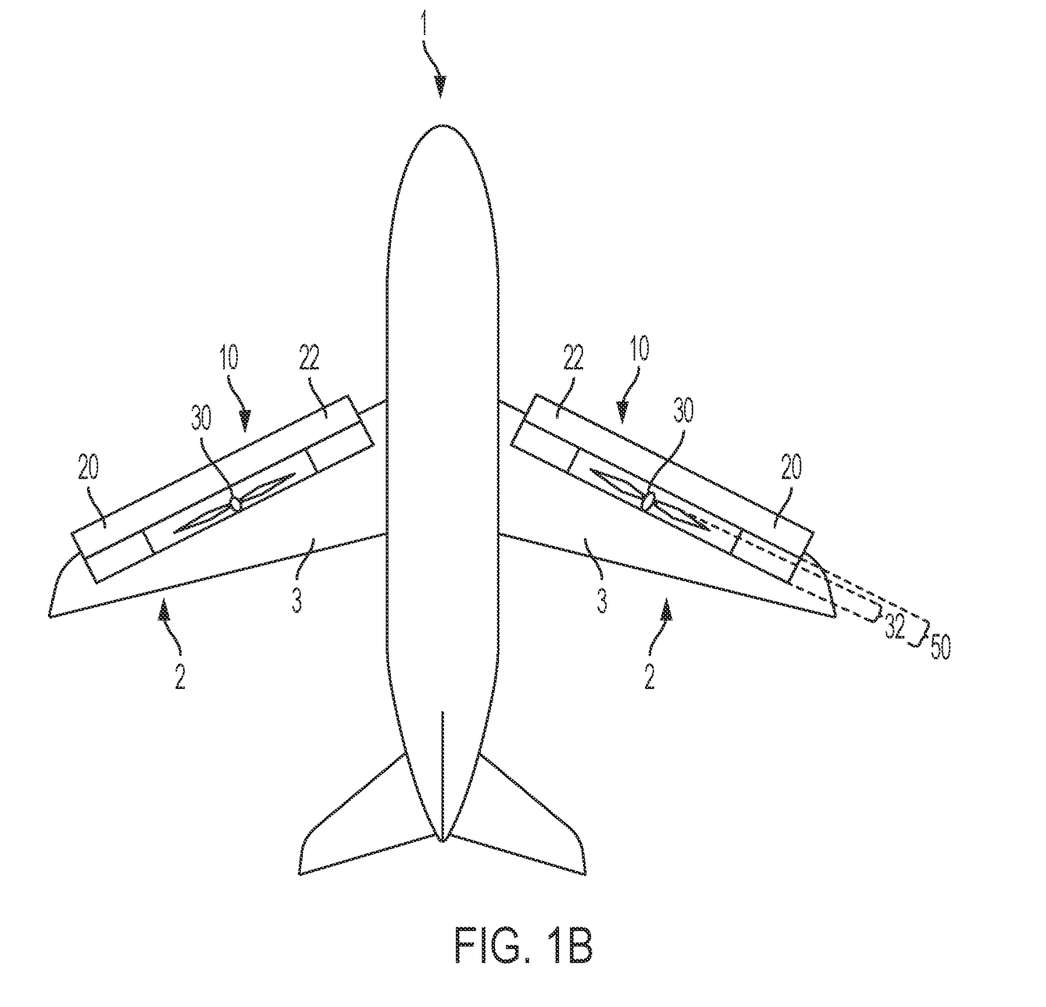
FIG. 1B is the aircraft of FIG. 1A with an aircraft wing and propulsion system in an open configuration in accordance with one or more embodiments of the present disclosure.
Figure 1C:
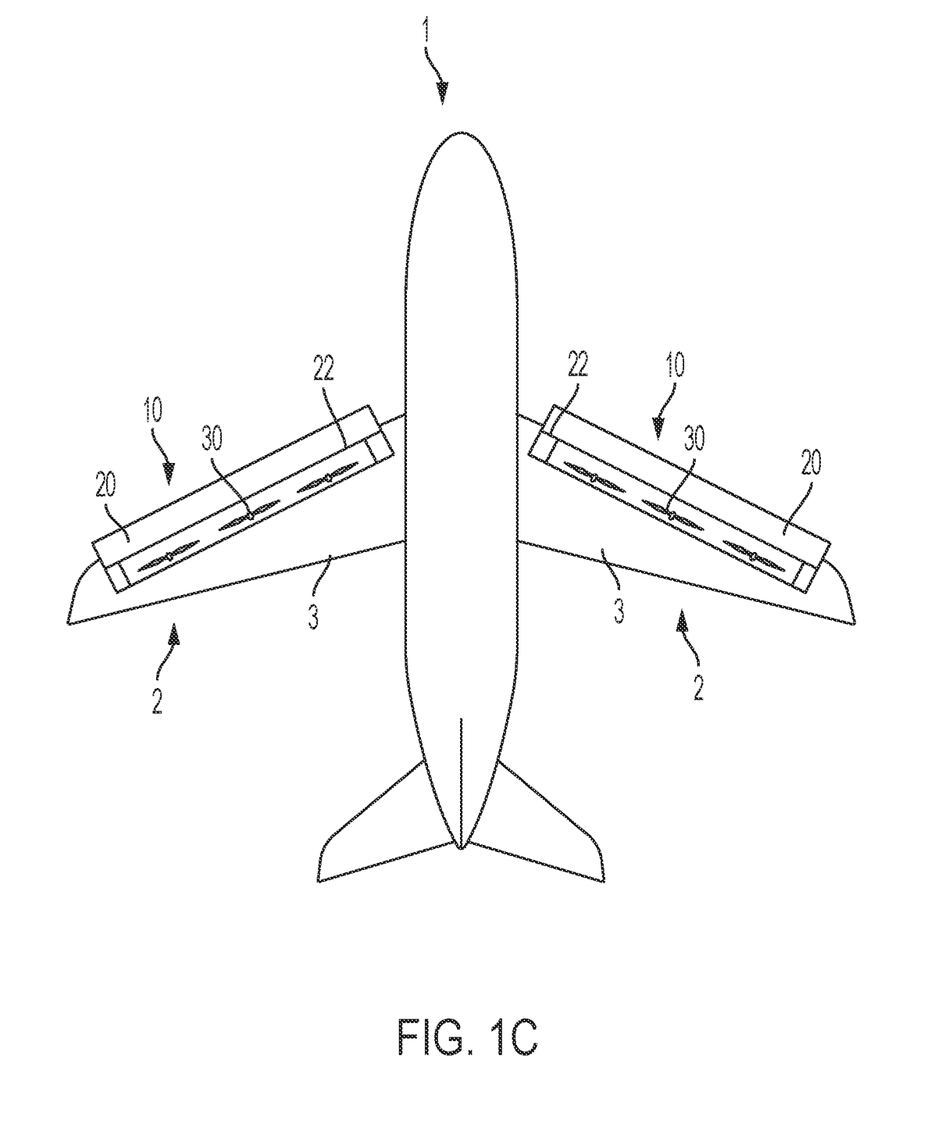
FIG. 1C is an alternate arrangement of the aircraft of FIG. 1A with an aircraft wing and propulsion system comprising three propulsors per wing in an open configuration in accordance with one or more embodiments of the present disclosure.
Figure 2:
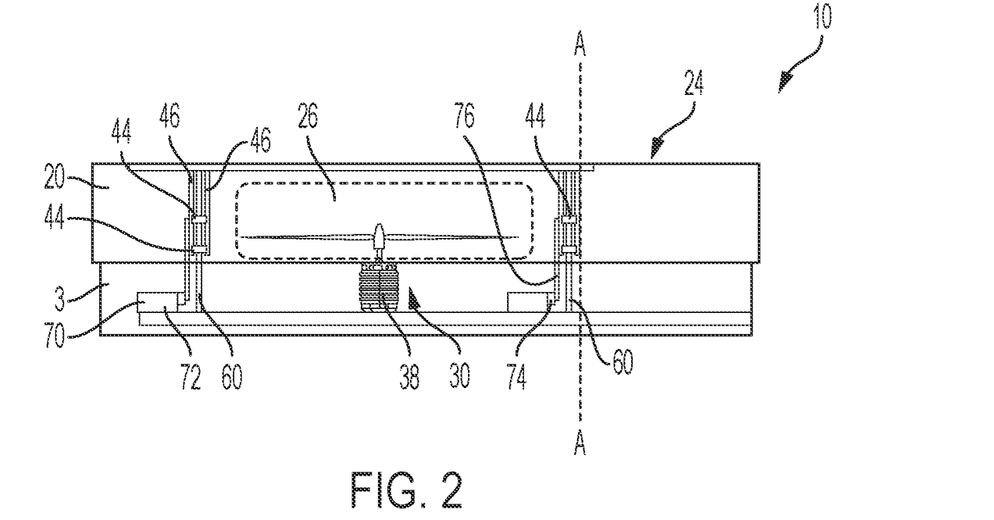
FIG. 2 is an aircraft wing and propulsion system in a closed configuration in accordance with one or more embodiments of the present disclosure.
Figure 3:
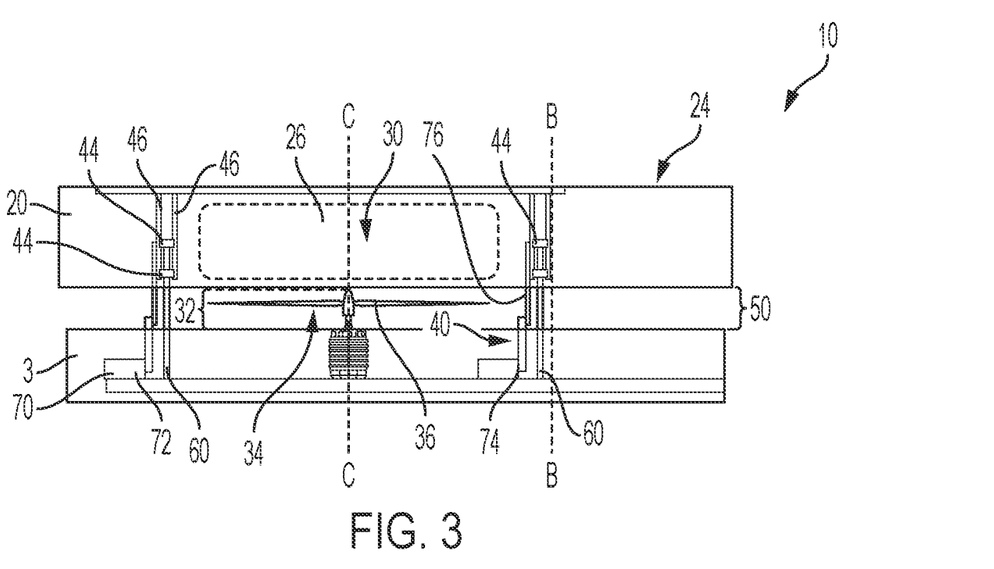
FIG. 3 is an aircraft wing and propulsion system in an open configuration in accordance with one or more embodiments of the present disclosure.
Figure 4:
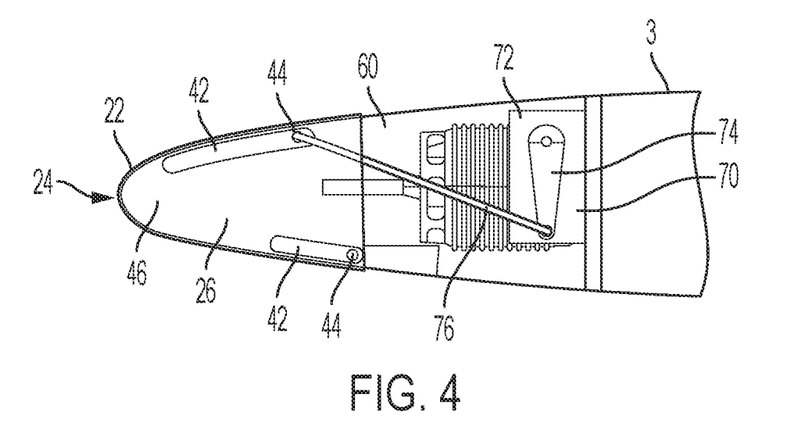
FIG. 4 is cut view along line A-A of FIG. 2.

The movable slat 22 comprises an aerodynamically profiled leading face 24 and at least a partially open interior forming a propulsor enclosure 26. The moveable slat 22 may be considered cap-shaped in that it forms a protective lid or cover over the leading edge of the aircraft wing 2 and more specifically over the propulsor 30. The moveable slat 22 represents a skin over a support frame such that a hollow body is formed with at least a portion of the open interior formed by the hollow body represents the propulsor enclosure 26. With reference to FIGS. 2 and 3, the propulsor enclosure 26 is emphasized by a dashed line. It will be appreciated that the propulsor enclosure 26 does not extend beyond the bounds of the movable slat 22 and is wholly formed by void space within the movable slat 22. The propulsor enclosure 26 is sized and configured to house any portion of the one or more propulsors 30 extending beyond the main body 3 of the aircraft wing 2 such that the movable slat 22 may be positioned in the closed configuration without impinging the one or more propulsors 30. Any impingement of the one or more propulsors 30 renders the resulting structure outside the parameters of the propulsor enclosure 26.

In one or more embodiments, the aerodynamically profiled leading face 24 of the movable slat 24 matches the profile of the leading edge of the aircraft wing 2 adjacent the leading-edge device 20. As such, when the movable slat 22 is in the closed position the profile at the leading edge of the combination of the aircraft wing 2 and the leading-edge device 20 matches the profile of the leading edge of the aircraft wing 2 of an aircraft without the aircraft wing and propulsion system 10 of the same or similar model as the aircraft 1 with the aircraft wing and propulsion system 10. In cases where the aircraft 1 is provided with the aircraft wing and propulsion system 10 during initial build and not as a retrofit, the aerodynamically profiled leading face 24 and the whole of an exterior surface of the movable slat 24 may be shaped to achieve desirable operation at cruising altitude and speed in accordance with traditional aircraft design principals.

The extension mechanism 40 translates the movable slat 22 between the closed position where the movable slat 22 is abutting the main body 3 of the aircraft wing 2 and the open position where the movable slat 22 is extended from the main body 3 of the aircraft wing 2 to expose the propulsors 30.

Figure 5:
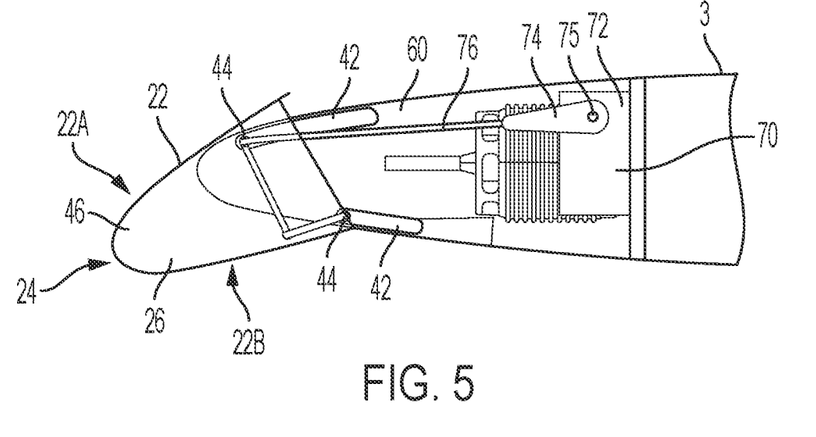
FIG. 5 is cut view along line B-B of FIG. 3.
Figure 6:
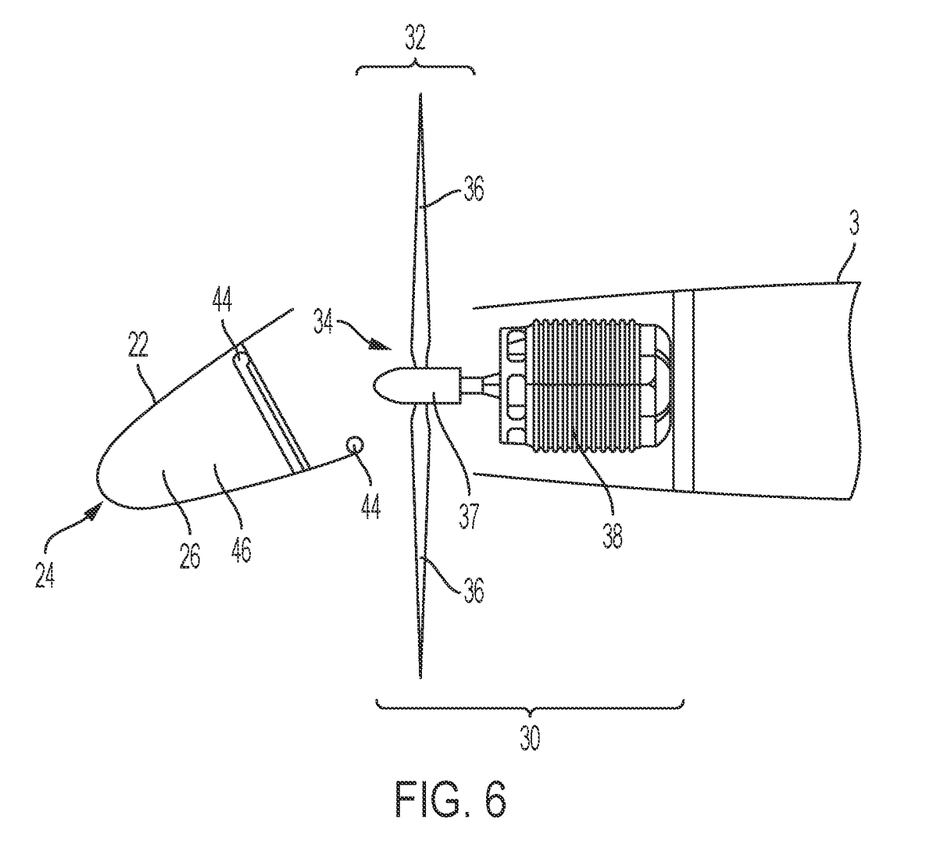
FIG. 6 is a cut view along line C-C of FIG. 3.

In one or more embodiments, the aerodynamically profiled leading face 24 of the moveable slat 22 to droop downward upon extension of the movable slat 22. This motion is similar in nature to traditional slats positioned on the leading edge of the wings of fixed-wing aircraft which, when deployed, allow the wing to operate at a higher angle of attack. Such drooping of the aerodynamically profiled leading face 24 of the moveable slat 22 downward upon extension of the movable slat 22 is illustrated in FIG. 5 where the movable slat 22 may be observed as positioned at a downward angle as compared to FIG. 4 where the movable slat is in a retracted or closed position.

The extension mechanism 40 affixing the moveable slat 22 to the main body 3 of the aircraft wing 2 may include any mechanism for translating the movable slat 22 between the closed position and the open position. The present disclosure provides multiple specific extension mechanisms 40 which are contemplated, but it will be appreciated that the movable slat 22 may also be translated using known systems presently implemented for movement of leading edge slats which are currently widely employed on fixed wing aircrafts. Leading edge slats, alternatively referenced as traditional slats in the present disclosure, are known features to those in the field of aeronautics as they are included are a majority of modern aircrafts. Such systems and arrangements to move or translate leading edge slats are also explicitly contemplated as embodiments of the present disclosure for extension of the moveable slat 22.

In one or more embodiments and with reference to FIGS. 2, 3, 4, and 5, the extension mechanism 40 comprises guide tracks 42 disposed in nose ribs 60 extending from the main body 3 of the aircraft wing 2, guide pins 44 affixed to the moveable slat 22 via support ribs 46 and disposed within the guide tracks 42, and an actuator 70 to advance the guide pins 44 along the guide tracks 42.

The nose ribs 60, in one or more embodiments, may be structural components of the airplane wing 2. Specifically, the airplane wing 2 comprises a series of ribs spread across the length of the airplane wing 2 which shape the leading edge of the airplane wing 2. As one skilled in aviation will appreciate, a nose rib 60 is a partial rib that extends only from the leading edge to the forward spar of the airplane wing 2. The nose rib 60 may alternatively be called a false rib, a term for any rib that does not extend the full chord of the airplane wing 2. The nose rib 60 may be installed between full ribs to support the leading edge of the airplane wing 2 and ensure it retains the proper shape. The nose ribs 60, positioned on each side of each propulsor 30, provide support to the leading edge of the airplane wing 2 represented by the movable slat 22 and ensure the movable slat 22 retains the desired shape.

The guide tracks 42 represent slots removed from the nose ribs 60 to form directed pathways for translation of the guide pins 44. The aircraft wing and propulsion system 10 generally includes two guide tracks 42 on each nose rib 60. In further embodiments, each nose rib 60 may comprise three, four, five, or more guide tracks 42 to meet the operation needs and desires of the aircraft wing and propulsion system 10. A multiplicity of guide tracks 42 with variance in width relative to the diameter of the guide pins 44 allows for added complexity in the travel path of the movable slat 22 during extension and retraction procedures.

The nose ribs 60 may be formed from materials compliant with guidelines for manufacture and implementation in aviation. For example, titanium, aluminum alloys, and polymer composites may be utilized to form the nose ribs 60 with the guide tracks 42 representing removed channels from the nose ribs 60. It will be appreciated that in one or more embodiments the nose ribs 60 may include a sleeve or other liner forming the guide tracks 42. The sleeve or liner forming the guide tracks 42 allows for a material with enhanced wear or abrasion resistance to be utilized at the interface of the guide tracks 42 and the guide pins 44 where repetitive relative motion is anticipated. Specific selection of materials is within the skill of those in the aviation field without undue experimentation to meet the specific operational and budgetary constraints of the implemented system.

Support ribs 46 are provided in the movable slats 22 to interface with the rose ribs 60. In one or more embodiments, the support ribs 46 form a planar partition across the movable slat 22 to retain the shape of the moveable slat 22 and engage with the guide pins 44. A support rib 46 may be provided immediately adjacent each face of the nose ribs 60 to form a channel that the nose rib 60 may be disposed within. With the nose rib 60 ensconced between mating support ribs 46, the guide pins 44 may be passed through the guide tracks 42 and affixed to the support ribs 46 to form an interlocked connection between the support ribs 46 of the moveable slat 22 and the nose ribs 60. In one or more embodiments, the guide pins 44 may be affixed to the nose ribs 60 in a manner such that the guide pins 44 are free to rotate and serve as rollers opposed to static pins.

The support ribs 46 and guide pins 44 may be formed from materials compliant with guidelines for manufacture and implementation in aviation. For example, titanium, aluminum alloys, and polymer composites may be utilized to form the support ribs 46, the guide pins 44, or both. It will be appreciated that in one or more embodiments the guide pins 44 may include a core of a first material and a shell of a second material. The core and shell arrangement of the guide pins 44 allows for a material with enhanced wear or abrasion resistance to be utilized as the shell at the interface of the guide tracks 42 and the guide pins 44 where repetitive relative motion is anticipated while allowing a second material selected for strength, weight, or other parameter forming the bulk of the guide pin 44. Specific selection of materials is within the skill of those in the aviation field without undue experimentation to meet the specific operational and budgetary constraints of the implemented system.

In one or more embodiments and with reference to FIGS. 2, 3, 4, and 5, the actuator 70 comprises an actuator motor 72, a control horn 74, and a push rod 76 to controllably extend and retract the guide pins 44 along the guide tracks 42. The guide pin 44 is attached to the push rod 76 that connects to the control horn 74 of the actuator motor 72. The control horn 74 is a section of the actuator motor 72 which projects ahead of a pivot point 75. The control horn 74 rotates or pivots relative to pivot point 75 which advances the push rod 76, a rigid member, forward to force the guide pins 44 to translate along the guide tracks 42. In one or more embodiments, the actuator motor 72 is a servo. The various components of the actuator 70 may be formed from materials compliant with guidelines for manufacture and implementation in aviation. For example, titanium, aluminum alloys, and polymer composites may be utilized to form one or more of components of the actuator motor 72, the control horn 74, and the push rod 76.

In one or more embodiments, the guide tracks 42 are oriented on the nose ribs 60 and the guide pins 44 are oriented on the support ribs 46 to cause the aerodynamically profiled leading face 24 of the moveable slat 22 to droop downward upon extension of the movable slat 22. For example, the positioning of the guide tracks 42 ad guide pins 44 may allow a top surface of the moveable slat 22A to translate further than an opposing bottom surface of the movable slat 22B resulting in rotation of the movable slat 22 at full extension.

In one or more embodiments of the extension mechanism 40, the movable slat 22 may comprise a plurality of rigid arms (not shown) instead of or affixed to the support ribs 46 which engages with channels (not shown) disposed within the main body 3 of the aircraft wing 2 in lieu of the guide tracks 42 on the nose ribs 60. The rigid arms may then be forcibly moved in a controlled manner to extend the rigid arms out of the main body 3 of the aircraft wing 2 to extend the movable slat 22 and create the gap 50. Such mechanism is presently implemented to extend and retract traditional slats on some existing aircrafts.

In one or more embodiments, traditional slats may be affixed to the movable slat 22 such that the traditional slats may allow the aircraft 1 with the aircraft wing and propulsion system to operate in the current customary manner with the movable slat 22 in the closed position.

With reference to FIGS. 1B, 1C, 3, and 6 the aircraft wing and propulsion system 10 includes one or more propulsors 30 affixed to the main body 3 of the aircraft wing 2. The propulsors 30 are provided to increase the speed of air across the aircraft wing 2, thus significantly increasing lift, especially during take-off and landing operations. In various embodiments, the aircraft 1 with the aircraft wing and propulsion system 10 may include a total of two propulsors 30, four propulsors 30, six propulsors 30, or eight propulsors 30 distributed between the aircraft wings 2. Additional propulsors 30 provided as part of the aircraft wing and propulsion system 10 disposed on each aircraft wing 2 provide increased airflow across the wing along with a commensurate increase in lift at the expense of additional deadweight during the cruising operations of the aircraft 1.

In one or more embodiments, each moveable slat 22 stows a single propulsor 30. In accordance with such embodiments, multiple moveable slats 22 may be provided on each aircraft wing 2 if more than one propulsor 30 is desired to be positioned on each aircraft wing 2.

In one or more embodiments, each moveable slat stows multiple propulsors 30. In accordance with such embodiments, a single moveable slat 22 may be provided on each aircraft wing 2 housing two or more propulsors 30. It is further noted, that in one or more embodiments where three or more propulsors 30 are desired to be positioned on each aircraft wing 2, all the propulsors 30 on each aircraft wing 2 may be stowed in a single moveable slat 22 or may be divided among two or more movable slats 22 to generate a distributed system.

In one or more embodiments, each propulsor 30 comprises a propeller 34 having blades 36 and a motor 38 to rotate the propeller 34. The propeller 34 may have two blades 36, alternatively called rotor blades 36, in one or more embodiments. In further embodiments, each propeller 34 may be formed from a plurality of two-bladed propellers in a stack configuration to generate a propeller 34 having four, six, or eight blades 36. In embodiments where each propeller 34 is formed from a plurality of two-bladed propellers, the propeller 34 should be configured to allow each of the two-bladed propellers to controllably rotated relative to the remainder such that each of the two-bladed propellers may be aligned for stowage. Specifically, to allow stowage of the propeller 34 within the propulsor enclosure 26 of the movable slat 22 when the movable slat 22 is in the closed position each of the two-bladed propellers must be substantially aligned in a parallel orientation. Conversely, when the propeller 34 is placed into operation each of the two-bladed propellers must be locked into skewed positions such that the blades 36 of the propeller 34 as a whole are at equally spaced cardinal positions of a circle formed by rotation of the blades 36. Equal spacing of the blades 36 will be appreciated as necessary to achieve balanced and smooth rotation of the propeller 34 by the motor 38 as an unbalanced propeller 34 would generate undesirable vibration.

In embodiments where each propulsor 30 includes a propeller 34, the propeller 34 is included in or represents the portion 32 of the propulsor 30 which is stowed within the propulsor enclosure 26 of the moveable slat 22 of the leading-edge device 20 when the movable slat 22 is in the closed position. Similarly, it will be noted that the propeller 34 is positioned in the gap 50 formed between the moveable slat 22 and the main body 3 of the aircraft wing 2 when the movable slat 22 is in the open position. As such, the propeller 34 is positioned to freely rotate without interference with the aircraft wing 2, the moveable slat 22, or other component of the aircraft 1.

In one or more embodiments, the propeller 34 comprises blades 36 fixed in an extended position. Specifically, the blades 36 of the propeller 34 are not configured to fold at the hub 37 of the propeller 34.

In one or more embodiments, the blades 36 of the propeller 34 are variable pitch blades. Specifically, the blades 36 of the propeller 34 are attached to the hub 37 of the propeller 34 in a manner that allows for adjustment of the pitch angle of each blade 36. Those with expertise of aircraft operation and design are familiar with variable pitch blades along with implementation of the same and connection to the hub 37. Varying the pitch of the blades 36 allows for adjustment to provide operational benefits of the aircraft 1. For example, effective angle of attack of the blades 36 of the propeller 34 decreases as airspeed increases, so a coarser pitch is required at higher airspeeds and as such the propulsors 30 may be adjusted to achieve maximum efficiency. Further, extreme variance of the pitch of the blades 36 may generate a negative blade pitch angle, and thus reverse the thrust from the propeller also known as Beta pitch. Such negative blade pitch angle provides a desirable operational ability in that reverse thrust may be used to help slow the aircraft 1 after landing which is particularly advantageous when landing on a wet runway where wheel braking has reduced effectiveness. Further, reverse pitch allows the aircraft 1 to taxi in reverse in certain circumstances.

The motor 38 drives rotation of the propeller 34. In one or more embodiments, the motor 38 is an electric motor. An electric motor as the motor 38 provides versatility as the propeller 34 may be started and stopped without requiring ignition of a fuel source. In one or more embodiments, the electric motor may be powered from an alternator connected to the primary propulsion system, such as a turbine engine, of the aircraft 1. In further embodiments, the electric motor may be powered from a battery. The battery may be recharged during ground operations from an external source or via an alternator connected to the primary propulsion system, such as a turbine engine, of the aircraft 1.

As the aircraft wing and propulsion system 10 may be implemented on a range of aircraft ranging, for example, from radio controlled hobby model aircraft to passenger airliners the sizing of the motor 38 is dependent on the airframe where the aircraft wing and propulsion system 10 is implemented. One skilled in the art can select the motor 38 having appropriate parameters for the size propulsor 30 which would be needed for a given airframe as well as the number of propulsors 30 deployed on a given airframe. In various embodiments, for a large scale aircraft, the motor 38 may range from 2 kilowatts (kW) to 20 kW or even greater than 20 kW. For example, six propulsors 30 each with a 2.4 kilowatt (kW) motor 38 may be positioned on each aircraft wing 2 to provide the desired power spectrum.

Figure 7:
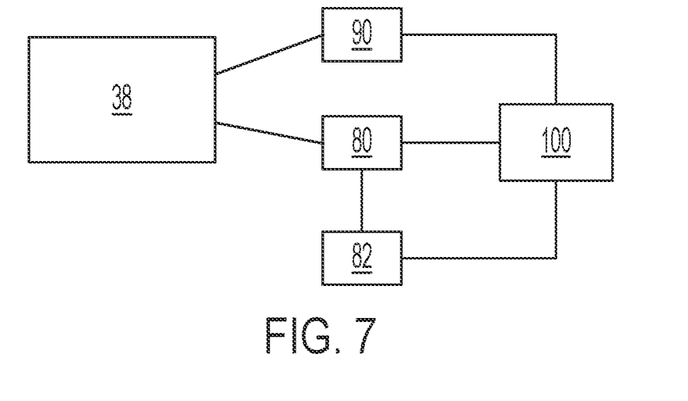
FIG. 7 is a schematic of a control system architecture for controlling the propulsor in accordance with one or more embodiments of the present disclosure.

In one or more embodiments and with reference to FIG. 7, each propulsor 30 comprises an electronic speed controller 80. The electronic speed controller 80 is configured to control the motor 38 and the rotational speed of the propeller 34 provided with the propulsor 30. In one or more embodiments, the electronic speed controller 80 includes an electrical braking mechanism 82. The electronic braking mechanism 82 is configured to controllably decrease the rotational speed of the propeller 34 provided with the propulsor 30. An example electronic speed controller 80 which includes an electronic braking mechanism 82, utilized for control of brushless electric motors used in model airplane and helicopters but transferable to the present disclosure, is the MasterSPIN 220 Pro commercially available from Hacker Motor GmbH (Ergolding, Germany). As such, electronic speed controllers 80 with electronic braking mechanisms 82 are known pieces of hardware to those skilled in the art which are fully described without redundant recitation of specific structures or internal mechanisms. The electronic speed controller 80 is omitted from illustration in FIGS. 2, 3, 4, 5, and 6 for readability of the figures as the electronic speed controller 80 is merely a module in communication with the motor 38 and may be placed at any location within the aircraft 1.

In one or more embodiments and with reference to FIG. 7, each propulsor 30 comprises a propulsor control module 90. The propulsor control module 90 is configured to operate the propulsor 30 based on commands received from a primary system coordinator module 100. The propulsor control module 90 specifically is configured to provide instructions to the motor 38 to advance the propeller 34 to a position with the blades 36 aligned with the propulsor enclosure 26 in the moveable slat 22. For example, the propulsor control module 90 functions to set and hold the position of the propeller 36 at the proper angle to allow the moveable slat 22 to travel to the closed position based on information obtained from the electronic speed controller 80 about the position and rotational status of the propeller 36. The propulsor control module 90 may include a microcontroller to perform the indicated functions. It is noted, that for purposes of the present disclosure indication that the propeller 34 is aligned with the propulsor enclosure 26 means that the movable slat 22 may be retracted to the closed position without any interference between the propeller 34 and the leading-edge device 20. Generally, this means the blades 36 of the propeller 34 are substantially parallel to the airplane wing 2.

Further, each propulsor 30 may have a dedicated propulsor control module 90 that operates the propulsor 30 based on commands received from the primary system coordinator module 100. In addition to operating the propulsor 30, the propulsor control module 90 monitors the health of the system 10 and status of the leading-edge device 20. Any faults may be relayed back to the primary system coordinator module 100 for appropriate action and resolution. Further, before deploying the leading-edge device 20, the propulsor control module 90 determines if the aircraft speed is within design limits to operate the leading-edge device 20. Then, before engaging the propulsor 30, the propulsor control module 90 first verifies that the leading edge device 20 is deployed and locked, aircraft speed is within design limits for operation of the system 10; and that no faults are detected. Similarly, before retracting the leading-edge device 20, the propulsor control module 90 verifies that the propeller 34 is stopped and parked in safe position, aircraft speed is within design limits for operating with the movable slat 22 retracted, and that no faults are detected in the extension mechanism 40. Finally, after presumed retraction of the moveable slat 22, the propulsor control module 90 verifies the moveable slat 22 is retracted and locked.

Further, the electrical and control systems of the aircraft wing and propulsion system 10 are flexible and can be located in multiple locations of the aircraft 10. One example location is within the wing 2 itself forward of the main spar, where the propulsor control module 90, battery pack, and motor 38 can be modularized as a single unit with the leading-edge device 20. Such a configuration allows simple retrofits to be designed for specific existing aircraft. The detailed design for any such aircraft wing and propulsion system 10 will include a propeller design specific for the mission, and shaping of the gap 50 to take advantage of the unique airflow characteristic through the gap 50. The specific geometry will depend on the flight characteristics, and may also be locally specific to the direction of the propeller blade 36 passing through the gap 50, since the individual blade 36 will always be moving upward on one side and downward on the other side.

Figure 8:
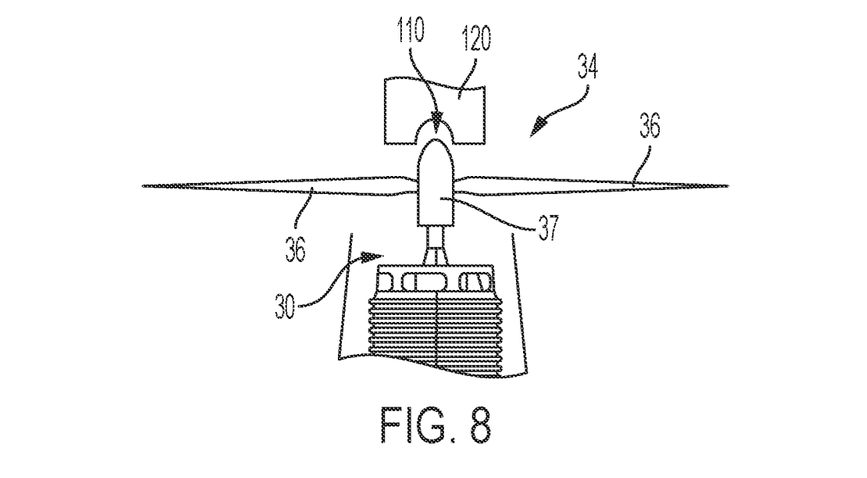
FIG. 8 is an illustration of engagement between a hub of the propeller on a propulsor and the leading edge device to mechanically align the propeller for stowage.

In one or more embodiments and with reference to FIG. 8, the hub 37 of the propeller 34 comprises an embossed pattern 110 complementary to a projection 120 provided on an interior face of the moveable slat 22 such that the embossed pattern 110 engages with the projection 120 provided on the interior face of the moveable slat 22 as the movable slat 22 is translated to the closed position to guide the propeller 34 into a position where the blades 36 are aligned with the propulsor enclosure 26 in the moveable slat 22. Such mechanism may serve as a backup should the propulsor control module 90 fail to properly align the propeller 34. The engagement between the embossed pattern 110 and the projection 120 additionally locks the propeller 34 in a parked position while the leading-edge device 20 is retracted and in the closed position. Such locking ensures the propeller 34 does not rotate out of alignment such that impingement might occur upon translation of the moveable slat 22 back to the open position.

Having generally described the components and features of the aircraft wing and propulsion system 10, methods of operating the same are also provided. Generally, the aircraft wing and propulsion system 10 may be operated in a manner similar to traditional slats on other aircraft. Specifically, prior to takeoff, the pilot deploys the leading-edge device 20 via a control in the cockpit. Power is applied at the appropriate time in the taxing and take-off procedures to engage the propulsors 30. After the desired altitude and flight speed has been attained, the pilot will disengage the propulsors 30 and retract the leading edge device 20 to enclose the propellers 34 of the propulsors 30. On approach to landing, the pilot then deploys the leading-edge device 20 and engages the propulsors 30 to assist with landing the aircraft and to allow for a slower ground speed.

In one or more embodiments, a method of operating the wing and propulsion system 10 of an aircraft 1 comprises extending the moveable slat 22 to expose the propulsors 30 on the aircraft wing 2 such that the propeller 34 is positioned within the gap 50 between the moveable slat 22 and the main body 3 of the aircraft wing 2 and then operating the propulsors 30 during take-off of the aircraft 1 to provide increased power and lift for the aircraft 1. Further, before operating the propulsors 30, the propulsor control module 90 may verify the moveable slat 22 is fully deployed and the airspeed of the aircraft 1 is within design limits.

In one or more embodiments, the method of operating the wing and propulsion system 10 of an aircraft 1 comprises ceasing operation of the propulsors 30 after take-off and retracting the moveable slat 22 to enclose the propulsors 30 on the aircraft wing 2 within the propulsor enclosure 26 of the moveable slat 22. Ceasing operation of the propulsors after take-off comprises terminating rotation of the propellers 34 with the electrical braking mechanism 82 and positioning the blades 36 of the propeller 34 to be aligned with the propulsor enclosure 26 in the moveable slat 22. Further, before retracting the moveable slat 22 to enclose the propulsors 30 on the aircraft wing 2, the propulsor control module 90 may verify the propeller 34 is stopped and oriented in a positioned aligned with the propulsor enclosure 26 in the moveable slat 22 and the airspeed of the aircraft 1 is within design limits.

It will be appreciated that the aircraft wing and propulsion system 10 is a flexible architecture which may be applied to any sized air vehicle, from group 1 unmanned aerial vehicles (UAV) through large cargo transports.

Having described various embodiments, it should be understood that the various aspects of the aircraft wing and propulsion system 10 and methods of operating the same are described and such aspects may be utilized in conjunction with various other aspects.

In a first aspect, the disclosure provides an aircraft wing and propulsion system. The system comprises a leading-edge device positioned at the leading edge of an aircraft wing, the leading-edge device comprising a moveable slat affixed to a main body of the aircraft wing with an extension mechanism such that the moveable slat is translatable between a closed position abutting a main body of the aircraft wing and an open position extended from the main body of the aircraft wing to form a gap between the moveable slat and the main body of the aircraft wing, where the movable slat comprises an aerodynamically profiled leading face and at least a partially open interior forming a propulsor enclosure; and one or more propulsors affixed to the main body of the aircraft wing, where at least a portion of each propulsor extends beyond the main body of the aircraft wing such that the portion of the propulsor is stowed within the propulsor enclosure of the moveable slat of the leading-edge device when the movable slat is in the closed position.

In a second aspect, the disclosure provides the system of the first aspect, in which each propulsor comprises a propeller having blades and a motor to rotate the propeller, the propeller stowed within the propulsor enclosure of the moveable slat of the leading-edge device when the movable slat is in the closed position.

In a third aspect, the disclosure provides the system of the second aspect, in which the propeller is a two-bladed propeller.

In a fourth aspect, the disclosure provides the system of the second or third aspects, in which the propeller is a plurality of two-bladed propellers provided in a stacked configuration.

In a fifth aspect, the disclosure provides the system of any of the second through fourth aspects, in which the propeller comprises blades fixed in an extended position.

In a sixth aspect, the disclosure provides the system of any of the second through fifth aspects, in which each propulsor comprises an electronic speed controller, the electronic speed controller configured to control the motor and the rotational speed of the propeller provided with the propulsor.

In a seventh aspect, the disclosure provides the system of the sixth aspect, in which the electronic speed controller includes an electrical braking mechanism, the electronic braking mechanism configured to controllably decrease the rotational speed of the propeller provided with the propulsor.

In an eighth aspect, the disclosure provides the system of any of the first through seventh aspects, in which each propulsor comprises a propulsor control module, the propulsor control module configured to operate the propulsor based on commands received from a primary system coordinator module.

In a ninth aspect, the disclosure provides the system of the ninth aspect, in which each propulsor comprises a propeller comprising blades and a motor to rotate the propeller, the propeller stowed within the propulsor enclosure of the moveable slat of the leading-edge device when the movable slat is in the closed position, and the propulsor control module is configured to provide instructions to the motor to advance the propeller to a position with the blades aligned with the propulsor enclosure in the moveable slat.

In a tenth aspect, the disclosure provides the system of any of the first through ninth aspects, in which the extension mechanism comprises: guide tracks disposed in nose ribs extending from the main body of the aircraft wing, guide pins affixed to the moveable slat and disposed within the guide tracks, and an actuator to advance the guide pins affixed to the moveable slat along the guide tracks.

In an eleventh aspect, the disclosure provides the system of the tenth aspect, in which the guide tracks are oriented to cause the aerodynamically profiled leading face of the moveable slat to droop downward upon extension of the movable slat.

In a twelfth aspect, the disclosure provides the system of any of the first through eleventh aspects, in which each moveable slat stows a single propulsor.

In a thirteenth aspect, the disclosure provides the system of any of the first through eleventh aspects, in which each moveable slat stows multiple propulsors.

In a fourteenth aspect, the disclosure provides the system of any of the first through thirteenth aspects, in which each propulsor comprises a propeller having blades and a motor to rotate the propeller, the propeller stowed within the propulsor enclosure of the moveable slat of the leading-edge device when the movable slat is in the closed position and the propeller further comprises a propeller hub, the propeller hub comprising an embossed pattern complementary to a projection provided on an interior face of the movable slat such that the embossed pattern of the propeller hub engages with the projection as the movable slat is translated to the closed position to guide the propeller into a position where the blades are aligned with the propulsor enclosure in the moveable slat.

In a fifteenth aspect, the disclosure provides the system of any of the first through fourteenth aspects, in which the aircraft wing is a fixed aircraft wing.

In a sixteenth aspect, the disclosure provides a method of operating a wing and propulsion system of an aircraft, the wing and propulsion system comprising: a leading-edge device positioned at the leading edge of an aircraft wing, the leading-edge device comprising a moveable slat affixed to a main body of the aircraft wing with an extension mechanism such that the moveable slat is translatable between a closed position abutting the main body of the aircraft wing and an open position extended from the main body of the aircraft wing to form a gap between the moveable slat and the main body of the aircraft wing, where the movable slat comprises an aerodynamically profiled leading face and at least a partially open interior forming a propulsor enclosure; and one or more propulsors affixed to the main body of the aircraft wing, where at least a portion of each propulsor extends beyond the main body of the aircraft wing such that the portion of the propulsor is stowed within the propulsor enclosure of the moveable slat of the leading-edge device when the movable slat is in the closed position, wherein each propulsor comprises a propeller comprising blades and a motor to rotate the propeller, the propeller stowed within the propulsor enclosure of the moveable slat of the leading-edge device when the movable slat is in the closed position, wherein the method comprises: extending the moveable slat to expose the propulsors on the aircraft wing such that the propeller is positioned within the gap between the moveable slat and the main body of the aircraft wing; and operating the propulsors during take-off of the aircraft to provide increased power and lift for the aircraft.

In a seventeenth aspect, the disclosure provides the method of the sixteenth aspect, in which the method further comprises: ceasing operation of the propulsors after take-off; and retracting the moveable slat to enclose the propulsors on the aircraft wing within the propulsor enclosure of the moveable slat.

In an eighteenth aspect, the disclosure provides the method of the seventeenth aspect, in which ceasing operation of the propulsors after take-off comprises: terminating rotation of the propellers with an electrical braking mechanism; and positioning the blades of the propeller to be aligned with the propulsor enclosure in the moveable slat.

In a nineteenth aspect, the disclosure provides method of operating a wing and propulsion system of an aircraft, the wing and propulsion system comprising: a leading-edge device positioned at the leading edge of an aircraft wing, the leading-edge device comprising a moveable slat affixed to a main body of the aircraft wing with an extension mechanism such that the moveable slat is translatable between a closed position abutting the main body of the aircraft wing and an open position extended from the main body of the aircraft wing to form a gap between the moveable slat and the main body of the aircraft wing, where the movable slat comprises an aerodynamically profiled leading face and at least a partially open interior forming a propulsor enclosure; and one or more propulsors affixed to the main body of the aircraft wing, where at least a portion of each propulsor extends beyond the main body of the aircraft wing such that the portion of the propulsor is stowed within the propulsor enclosure of the moveable slat of the leading-edge device when the movable slat is in the closed position, wherein each propulsor comprises a propeller comprising blades and a motor to rotate the propeller, the propeller stowed within the propulsor enclosure of the moveable slat of the leading-edge device when the movable slat is in the closed position, wherein the method comprises: extending the moveable slat to expose the propulsors on the aircraft wing such that the propeller is positioned within the gap between the moveable slat and the main body of the aircraft wing; and operating the propulsors during landing of the aircraft to provide increased power and lift for the aircraft.

In a twentieth aspect, the disclosure provides the method of the nineteenth aspect, in which the method further comprises: ceasing operation of the propulsors after landing; and retracting the moveable slat to enclose the propulsors on the aircraft wing within the propulsor enclosure of the moveable slat.

In twenty-first aspect, the disclosure provides the method of the twentieth aspect, in which ceasing operation of the propulsors after landing comprises: terminating rotation of the propellers with an electrical braking mechanism; and positioning the blades of the propeller to be aligned with the propulsor enclosure in the moveable slat.

In a twenty-second aspect, the disclosure provides the method of any of the sixteenth through twenty-first aspects, in which before operating the propulsors, a propulsor control module verifies the moveable slat is fully deployed and the airspeed of the aircraft is within design limits.

In a twenty-third aspect, the disclosure provides the method of the sixteenth through twenty-second aspects, in which before retracting the moveable slat to enclose the propulsors on the aircraft wing, a propulsor control module verifies the propeller is stopped and oriented in a positioned aligned with the propulsor enclosure in the moveable slat and the airspeed of the aircraft is within design limits.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. An aircraft wing and propulsion system comprising:
a leading-edge device positioned at the leading edge of an aircraft wing, the leading-edge device comprising a moveable slat affixed to a main body of the aircraft wing with an extension mechanism such that the moveable slat is translatable between a closed position abutting a main body of the aircraft wing and an open position extended from the main body of the aircraft wing to form a gap between the moveable slat and the main body of the aircraft wing, where the movable slat comprises an aerodynamically profiled leading face and at least a partially open interior forming a propulsor enclosure; and one or more propulsors affixed to the main body of the aircraft wing, where at least a portion of each propulsor extends beyond the main body of the aircraft wing such that the portion of the propulsor is stowed within the propulsor enclosure of the moveable slat of the leading-edge device when the movable slat is in the closed position, wherein each propulsor comprises a propeller having blades and a motor to rotate the propeller, the propeller stowed within the propulsor enclosure of the moveable slat of the leading-edge device when the movable slat is in the closed position and the propeller is positioned in the gap formed between the moveable slat and the main body of the aircraft wing when the movable slat is in the open position.

2. The aircraft wing and propulsion system of claim 1, wherein the propeller is a two-bladed propeller.

3. The aircraft wing and propulsion system of claim 2, wherein the propeller is formed from a plurality of two-bladed propellers provided in an axially stacked configuration.

4. The aircraft wing and propulsion system of claim 1, wherein the propeller comprises blades fixed in an extended position.

5. The aircraft wing and propulsion system of claim 1, wherein the aircraft wing is a fixed aircraft wing.

6. The aircraft wing and propulsion system of claim 1, wherein each propulsor comprises an electronic speed controller, the electronic speed controller configured to control the motor and the rotational speed of the propeller provided with the propulsor.

7. The aircraft wing and propulsion system of claim 6, wherein the electronic speed controller includes an electrical braking mechanism, the electronic braking mechanism configured to controllably decrease the rotational speed of the propeller provided with the propulsor.

8. The aircraft wing and propulsion system of claim 1, wherein each propulsor comprises a propulsor control module, the propulsor control module configured to operate the propulsor based on commands received from a primary system coordinator module.

9. The aircraft wing and propulsion system of claim 8, wherein:

each propulsor comprises a propeller comprising blades and a motor to rotate the propeller, the propeller stowed within the propulsor enclosure of the moveable slat of the leading-edge device when the movable slat is in the closed position, and the propulsor control module is configured to provide instructions to the motor to advance the propeller to a position with the blades aligned with the propulsor enclosure in the moveable slat.

10. The aircraft wing and propulsion system of claim 1, wherein the extension mechanism comprises:

guide tracks disposed in nose ribs extending from the main body of the aircraft wing, guide pins affixed to the moveable slat and disposed within the guide tracks, and an actuator to advance the guide pins affixed to the moveable slat along the guide tracks.

11. The aircraft wing and propulsion system of claim 10, wherein the guide tracks are oriented to cause the aerodynamically profiled leading face of the moveable slat to droop downward upon extension of the movable slat.

12. The aircraft wing and propulsion system of claim 1, wherein each moveable slat stows a single propulsor.

13. The aircraft wing and propulsion system of claim 1, wherein each moveable slat stows multiple propulsors.

14. The aircraft wing and propulsion system of claim 1, wherein the propeller further comprises a propeller hub, the propeller hub comprising an embossed pattern complementary to a projection provided on an interior face of the movable slat such that the embossed pattern of the propeller hub engages with the projection as the movable slat is translated to the closed position to guide the propeller into a position where the blades are aligned with the propulsor enclosure in the moveable slat.

15. A method of operating a wing and propulsion system of an aircraft, the wing and propulsion system comprising:

a leading-edge device positioned at the leading edge of an aircraft wing, the leading-edge device comprising a moveable slat affixed to a main body of the aircraft wing with an extension mechanism such that the moveable slat is translatable between a closed position abutting the main body of the aircraft wing and an open position extended from the main body of the aircraft wing to form a gap between the moveable slat and the main body of the aircraft wing, where the movable slat comprises an aerodynamically profiled leading face and at least a partially open interior forming a propulsor enclosure; and one or more propulsors affixed to the main body of the aircraft wing, where at least a portion of each propulsor extends beyond the main body of the aircraft wing such that the portion of the propulsor is stowed within the propulsor enclosure of the moveable slat of the leading-edge device when the movable slat is in the closed position, wherein each propulsor comprises a propeller comprising blades and a motor to rotate the propeller, the propeller stowed within the propulsor enclosure of the moveable slat of the leading-edge device when the movable slat is in the closed position, wherein the method comprises:

extending the moveable slat to expose the propulsors on the aircraft wing such that the propeller is positioned within the gap between the moveable slat and the main body of the aircraft wing; and operating the propulsors during take-off of the aircraft to provide increased power and lift for the aircraft.

16. The method of claim 15, wherein the method further comprises:

ceasing operation of the propulsors after take-off; and retracting the moveable slat to enclose the propulsors on the aircraft wing within the propulsor enclosure of the moveable slat.

17. The method of claim 16, wherein ceasing operation of the propulsors after take-off comprises:

terminating rotation of the propellers with an electrical braking mechanism; and positioning the blades of the propeller to be aligned with the propulsor enclosure in the moveable slat.

18. The method of claim 15, wherein before operating the propulsors, a propulsor control module verifies the moveable slat is fully deployed and the airspeed of the aircraft is within design limits.

19. The method of claim 16, wherein before retracting the moveable slat to enclose the propulsors on the aircraft wing, a propulsor control module verifies the propeller is stopped and oriented in a positioned aligned with the propulsor enclosure in the moveable slat and the airspeed of the aircraft is within design limits.

\* \* \* \* \*